US009587739B2

(12) United States Patent
Ichikawa et al.

(10) Patent No.: US 9,587,739 B2
(45) Date of Patent: Mar. 7, 2017

(54) INTERLOCK MECHANISM (71) Applicant: AISIN AI CO., LTD., Nishio-shi, Aichi-ken (JP)

(72) Inventors: Masaya Ichikawa, Anjo (JP); Hideya Osawa, Chiryu (JP); Hirotoshi Tanaka, Aichi-ken (JP)

(73) Assignee: AISIN AI CO., LTD., Nishio-shi, Aichi-ken (JP)

( * ) Notice: Subject to any disclaimer, the term of this patent is extended or adjusted under 35 U.S.C. 154(b) by 0 days.

(21) Appl. No.: 14/746,139

(22) Filed: Jun. 22, 2015

(65) Prior Publication Data
US 2016/0084377 A1   Mar. 24, 2016

(30) Foreign Application Priority Data

Sep. 24, 2014   (JP) .................................. 2014-194222

(51) Int. Cl.
*F16H 63/36* (2006.01)
*F16H 63/20* (2006.01)
(Continued)

(52) U.S. Cl.
CPC ......... *F16H 63/20* (2013.01); *F16H 63/3408* (2013.01); *F16H 63/36* (2013.01);
(Continued)

(58) Field of Classification Search
CPC ....... G05G 5/08; F16H 63/36; F16H 63/3408; F16H 63/20; F16H 63/206; F16H 2063/208; F16H 2063/322
(Continued)

(56) References Cited

U.S. PATENT DOCUMENTS

| 1,375,216 A | 4/1921 | Frins |
| 4,320,670 A * | 3/1982 | Kawamoto ........... F16H 59/042 |
| | | 74/473.24 |

(Continued)

FOREIGN PATENT DOCUMENTS

| DE | 1731865 U | 10/1956 |
| DE | 2317725 A1 | 10/1973 |

(Continued)

OTHER PUBLICATIONS

The extended European Search Report issued on Nov. 24, 2015, by the European Patent Office in corresponding European Application No. 15172831.8. (9 pages).

*Primary Examiner* — Terence Boes
*Assistant Examiner* — Randell J Krug
(74) *Attorney, Agent, or Firm* — Buchanan Ingersoll & Rooney PC (57) ABSTRACT

An interlock mechanism includes a shift-and-select shaft a first fork, a second fork, a first inner lever, a second inner lever, an interlock member coaxially arranged around an outer circumference of the shift-and-select shaft while being allowed to rotate together with the shift-and-select shaft in the rotation direction as a unit and not allowed to be displaced in the axial direction, a first engagement portion formed on the first fork, a second engagement portion formed to project from the second fork, a first engaged portion formed to project from the inter lock member and engaged with the first engagement portion while the interlock member is positioned at a second rotation position and a second engaged portion formed on the interlock member and engaged with the second engagement portion while the interlock member is positioned at a first rotation position.

2 Claims, 10 Drawing Sheets

(51) Int. Cl.

| | | |
|---|---|---|
| *F16H 63/34* | (2006.01) | |
| *G05G 5/08* | (2006.01) | |
| *F16H 3/091* | (2006.01) | |
| *F16H 63/32* | (2006.01) | |

(52) U.S. Cl.
CPC .......... *F16H 3/0915* (2013.01); *F16H 63/206* (2013.01); *F16H 2063/208* (2013.01); *F16H 2063/322* (2013.01); *F16H 2063/325* (2013.01); *F16H 2200/0052* (2013.01); *G05G 5/08* (2013.01)

(58) Field of Classification Search
USPC .......................... 74/473.24, 473.21, 473.25
See application file for complete search history.

(56) References Cited

U.S. PATENT DOCUMENTS

| | | | | | |
|---|---|---|---|---|---|
| 4,507,981 | A | * | 4/1985 | Hiraiwa | ................ F16H 63/36 74/473.24 |
| 4,920,815 | A | * | 5/1990 | Reynolds | .............. F16H 63/206 74/335 |
| 5,297,453 | A | * | 3/1994 | Chene | ..................... F16H 63/20 74/473.24 |
| 5,996,436 | A | * | 12/1999 | Dreier | .................. F16H 63/206 74/473.21 |
| 8,726,752 | B2 | * | 5/2014 | Beer | .................. F16H 63/3408 74/335 |
| 2006/0005649 | A1 | * | 1/2006 | Baldascini | .............. F16H 61/30 74/335 |
| 2012/0304794 | A1 | | 12/2012 | Beer | |

FOREIGN PATENT DOCUMENTS

| | | | |
|---|---|---|---|
| DE | 10045266 | A1 | 4/2002 |
| JP | 57-29120 | A | 2/1982 |
| JP | 2009-168217 | A | 7/2009 |
| JP | 2011163408 | A * | 8/2011 |
| JP | 2012007672 | A * | 1/2012 |

\* cited by examiner

FIG. 7A   FIRST-SECOND SPEED STAGE

FIRST ROTATION POSITION

FIG. 7B   THIRD-FOURTH SPEED STAGE

SECOND ROTATION POSITION

FIG. 7C   FIFTH-SIXTH SPEED STAGE

THIRD ROTATION POSITION

FIG. 7D   REVERSE STAGE

REVERSE ROTATION POSITION

FIG. 8A
FIRST-SECOND SPEED STAGE

FIRST ROTATION POSITION

FIG. 8B
THIRD-FOURTH SPEED STAGE

SECOND ROTATION POSITION

FIG. 8C
FIFTH-SIXTH SPEED STAGE

THIRD ROTATION POSITION

FIG. 8D
REVERSE STAGE

REVERSE ROTATION POSITION

FIG. 9A

FIRST ROTATION POSITION

FIG. 9B

SECOND ROTATION POSITION

FIG. 9C

THIRD ROTATION POSITION

FIG. 9D

REVERSE ROTATION POSITION

FIG. 10A

FIRST-SECOND SPEED STAGE

FIRST ROTATION POSITION

FIG. 10B

THIRD-FOURTH SPEED STAGE

SECOND ROTATION POSITION

FIG. 10C

FIFTH-SIXTH SPEED STAGE

THIRD ROTATION POSITION

FIG. 10D

REVERSE STAGE

REVERSE ROTATION POSITION

INTERLOCK MECHANISM

This application claims priority under 35 U.S.C. 119 with respect to Japanese Application No. 2014-194222 filed in Japan on Sep. 24, 2014, the entire content of which is herein incorporated by reference.

TECHNICAL FIELD

This invention relates to an interlock mechanism for a transmission.

BACKGROUND OF THE TECHNOLOGY

As described in Patent Document 1, conventionally an interlock mechanism that prevents a displacement of a non-selected fork while a shifting operation is conducted by an operator of a vehicle has been known. The interlock mechanism of Patent Document 1 includes a shift-and-select shaft being rotatable in response to a selecting operation by the operator of the vehicle, an interlocking rod arranged in parallel to the shift-and-select shaft and being rotatable in conjunction with rotation of the shift-and-select shaft and an interlocking arm fixed on the interlocking rod and configured to engage with/disengage from each fork depending on an angular position of the interlocking rod in a rotation direction.

According to the conventional interlock mechanism, a select arm fixed on the shift-and-select shaft is connected to a select bracket, which is fixed on the interlocking rod, no that the Interlocking rod is rotated in conjunction with the shift-and-select shaft.

DOCUMENT LIST OF STATE OF ART

Patent Document

Patent Document 1: JP2009-168217A

DISCLOSURE OF INVENTION

Problems to be Solved

However, since the interlock mechanism disclosed in Patent Document 1 includes the interlocking rod, the select arm and the select bracket, a relatively large number of components are used for the interlock mechanism, which may result in increase of size of the interlock mechanism as a whole. Furthermore, complexity of the interlock mechanism due to the relatively large number of components used for the interlock mechanism increases the manufacturing cost thereof.

The present invention was made in consideration of the above issues and an object of the invention is to provide an interlock mechanism using less components.

SUMMARY OF THE INVENTION

The invention associated with an aspect to solve the problems is characterized in that the interlock mechanism, includes a shift-and-select shaft allowed to be displaced in an axial direction and rotated in a rotation direction, a first fork arranged so as to oppose to the shift-and-select shaft, a second fork arranged so as to oppose to the shift-and-select shaft, a first inner lever provided on the shift-and-select shaft, engaged with the first fork while the shift-and-select shaft is positioned at a first rotation position, and disengaged from the first fork while the shift-and-select shaft is positioned at rotation positions other than the first rotation position, a second inner lever provided on the shift-and-select shaft, engaged with the second fork while the shift-and-select shaft is positioned at a second rotation position, which is located at a position further forwardly rotated from the first rotation position, and disengaged from the second fork while the shift-and-select shaft is positioned at the rotation positions other than the second rotation position, an interlock member coaxially arranged around an outer circumference of the shift-and-select shaft, which is allowed to rotate together with the shift-and-select shaft in the rotation direction as a unit and not allowed to be displaced in the axial direction. The inter lock mechanism further includes a first engagement portion formed on the first fork so as to project therefrom, a second engagement portion formed on the second fork so as to project therefrom, a first engaged portion formed on the inter lock member by cutting off a portion thereof and engaged with the first engagement portion while the interlock member is positioned at the second rotation position and a second engaged portion formed on the interlock member by cutting off a portion thereof and engaged with the second engagement portion while the interlock member is positioned at the first rotation position.

Accordingly, the interlock mechanism for preventing the displacement of the non-selected forks is achieved simply by providing the interlock member, which is configured to engage with/disengage from the first fork and the second fork depending on the position of the shift-and-select shaft in the rotation direction, at the outer circumference of the shift-and-select shaft in the coaxial manner. As a result, the number of components used for the interlock mechanism is reduced compared to the conventional interlock mechanism.

BRIEF EXPLANATION OF ATTACHED DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

THE EMBODIMENTS FOR IMPLEMENTING THE INVENTION (Configuration of Transmission)

A transmission 100 according to the embodiment will be explained below with reference to FIG. 1. The explanation will be given with the left side in FIG. 1 being referred to as the front side of the transmission 100, and the right side in FIG. 1 being referred to as the rear side of the transmission 100. Further, the front-rear direction of the transmission 100 is referred to as an axial direction in the following explanation.

Figure 1:
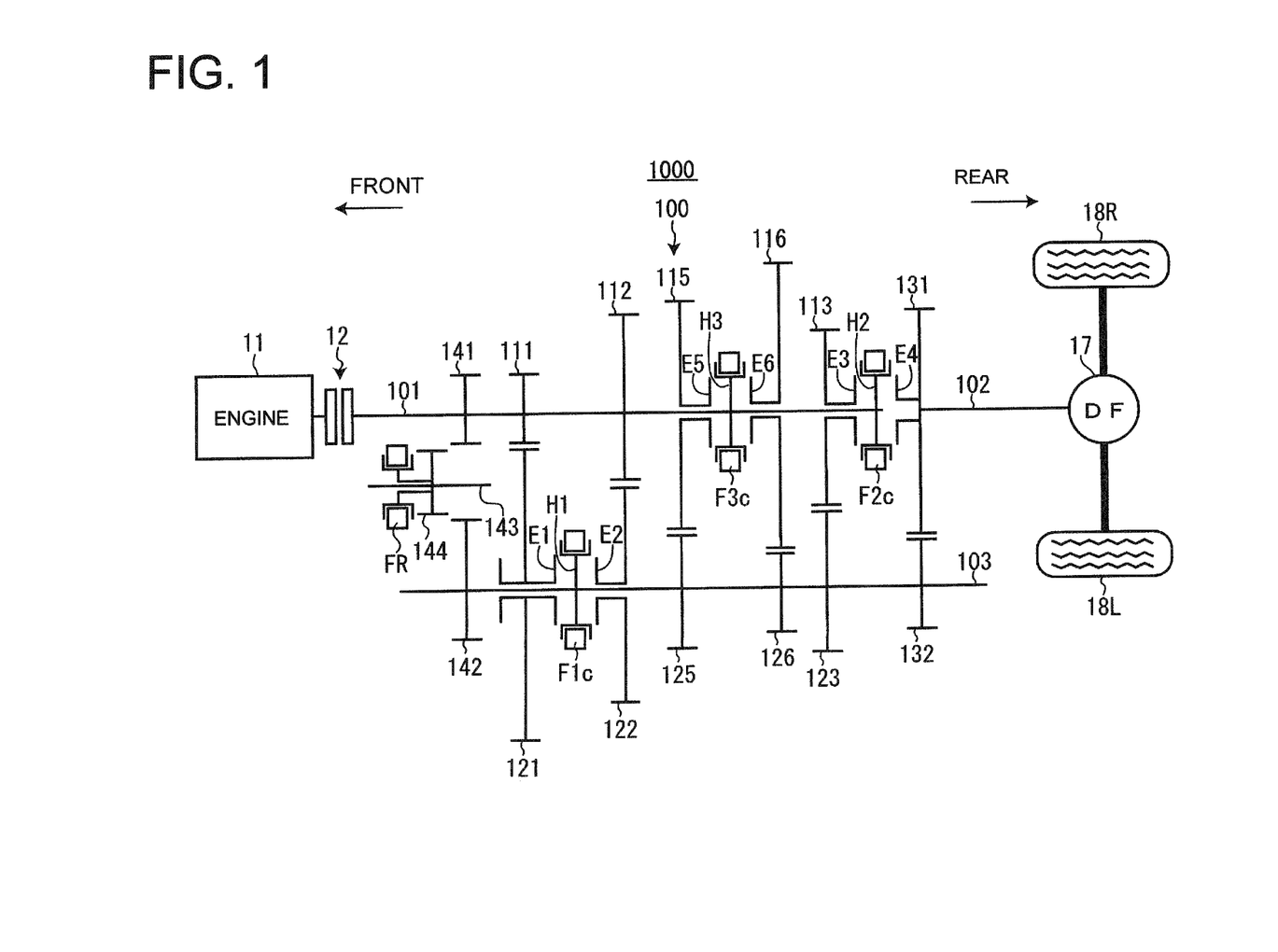
FIG. 1 is an explanatory diagram of a transmission.

As illustrated in FIG. 1, the transmission 100 of the embodiment includes an input shaft 101, an output shaft 102, a counter shaft 103, a first drive gear 111, a second drive gear 112, a third drive gear 113, a fifth drive gear 115, a sixth drive gear 116, a first driven gear 121, a second driven gear 122, a third driven gear 123, a fifth driven gear 125, a sixth driven gear 126, an output shaft-side reduction gear 131, a counter shaft-side reduction gear 132, a reverse drive gear 141, a reverse driven gear 142, an idler shaft 143, a reverse idler gear 144, a first hub H1, a second hub H2, a third hub H3, a first fork F1, a second fork F2, a third fork F3 and a reverse fork FR.

The input shaft 101, the output shaft 102 and the counter shaft 13 are rotatably provided at a housing (not shown) of the transmission 100. The input shaft 101 is connected to a clutch 12, so that rotational torque transmitted from an engine 11 is inputted to the input shaft 101 via the clutch 12. The output shaft 102 is arranged at a location rearward of the input shaft 101 in a coaxial manner relative to the input shaft 101. The output shaft 102 is connected with a differential device 17, which absorbs a rotation speed differential between driving wheels 18R and 18L. The counter shaft 103 is arranged in parallel to the input shaft 101 and the output shaft 102.

The first drive gear 111 and the second drive gear 112 are fixed on the input shaft 101. On the other hand, the fifth drive gear 115, the sixth drive gear 116 and the third drive gear 113 are rotatably provided on the input shaft 101. In this embodiment, the first drive gear 111, the second drive gear 112, the fifth drive gear 115, the sixth drive gear 116 and the third drive gear 113 are arranged in that order from the front to the rear of the input shaft 101.

The first driven gear 121 and the second driven gear 122 are rotatably provided on the counter shaft 103. On the other hand, the fifth driven gear 125, the sixth driven gear 126 and the third driven gear 123 are fixed on the counter shaft 103. In this embodiment, the first driven gear 121, the second driven gear 122, the fifth driven gear 125, the sixth driven gear 126 and the third driven gear 123 are arranged in that order from the front to the rear of the counter shaft 103.

The first drive gear 111 and the first driven gear 121 are meshed with each other. The second drive gear 112 and the second driven gear 122 are meshed with each other. The third drive gear. 113 and the third driven gear 123 are meshed with each other. Further, the fifth drive gear 115 and the fifth driven gear 125 are meshed with each other.

The gear diameter increases from the first drive gear 111, the second drive gear 112, the third drive gear 113 to the fifth drive gear 115 in that order. On the other hand, the gear diameter decreases from the first driven gear 121, the second driven gear 122, the third driven gear 123, and the fifth driven gear 125 to the sixth driven gear 126 in that order. In this embodiment, the fifth drive gear 115 is formed to have a larger diameter than the fifth driven gear 125.

The output shaft-side reduction gear 131 is provided on the output shaft 102. The counter shaft-side reduction gear 132 is provided on the counter shaft 103. The output shaft-side reduction gear 131 and the counter shaft-side reduction gear 132 are meshed with each other. The counter shaft-side reduction gear 132 is formed to have a smaller diameter than the output shaft-side reduction gear 131. Therefore, the rotational torque outputted from the engine 11 is reduced between the counter shaft-side reduction gear 132 and the output shaft-side reduction gear 131.

The idler shaft 143 is rotatably provided at the housing of the transmission 100 in such a manner that the idler shaft 143 extends parallel to the input shaft 101 and the counter shaft 103. The reverse drive gear 141 is provided on the output shaft 101. The reverse driven gear 142 is provided on the counter shaft 103. The reverse idler gear 144 is provided on the idler shaft 143 while being allowed to be displaced in the axial direction (i.e. in the front-rear direction). Furthermore, the reverse idler gear 144 is engaged with the reverse fork FR. The reverse idler gear 144 is engaged with/ disengaged from the reverse drive gear 141 and the reverse driven gear 142 depending on the position of the reverse idler gear 144 in the axial direction.

The first hub H1 is provided on the counter shaft 103 at a location between the first driven gear 121 and the second driven gear 122 while not being allowed to rotate relative to the counter shaft 103 and while being allowed to be displaced in the axial direction. The first hub H1 is engaged with a connection portion F1c of the first fork F1. Furthermore, the first hub H1 is engaged with either a first engagement portion E1 formed at the first driven gear 121 or a second engagement portion E2 formed at the second driven gear 121 and is disengaged from the other one of the first engagement portion E1 and the second engagement portion E2 depending on the position of the first hub H1 in the axial direction.

The second hub H2 is provided on the input shaft 101 at a location between the third drive gear 113 and the output shaft 102 while not being allowed to rotate relative to the input shaft 101 and while being allowed to be displaced in the axial direction. The second hub H2 is engaged with a connection portion F2c of the second fork F2. Furthermore, the second hub H2 is engaged with either a third engagement portion E3 formed at the third drive gear 113 or a fourth engagement portion E4 formed on the output shaft 102 and is disengaged from the other one of the third engagement portion E3 and the fourth engagement portion E4 depending on the position of the second hub H2 in the axial direction.

The third hub H3 is provided on the input shaft 101 at a location between the fifth drive gear 115 and the sixth drive gear 116 while not being allowed to rotate relative to the input shaft 101 and while being allowed to be displaced in the axial direction. The third hub H3 is engaged with a connection portion F3c of the third fork F3. Furthermore, the third hub H3 is engaged with either a fifth engagement portion E5 formed at the fifth drive gear 115 or a sixth engagement portion E6 formed at the sixth drive gear 116 and is disengaged from the other one of the fifth engagement portion E5 and the sixth engagement portion E6 depending on the position of the third hub H3 in the axial direction.

A synchronizer mechanism for synchronizing the rotation speed difference between each of the hubs H1 through H3 and each of the corresponding engagement portions E1 through E6 is provided between each of the hubs H1 through H3 and each of the corresponding engagement portions E1 through E6. A known synchronizer mechanism is adopted, and therefore an explanation about the synchronizer mechanism is not given in this explanation.

(Shift Mechanism)

A shift mechanism 10 will be explained below with reference to FIGS. 2 to 10. The shift mechanism 10 establishes speed stages of the transmission 100. The shift mechanism 10 includes a shift-and-select shaft 1, an interlock member 2, a reverse fork shaft 3, a reverse fork connecting member 4, the first fork F1, the second fork F2, the third fork F3, the reverse fork FR, a first inner lever e1, a second inner lever e2, a third inner lever e3, and a reverse inner lever "er".

The shift-and-select shaft 1 is supported at the housing of the transmission 100 while being allowed to be slidably movable in the axial direction and rotate. The shift-and-select shaft 1 is displaced in the axial direction by a conversion mechanism (not shown) in response to a displacement of a shift lever 990 (see FIG. 6), which is provided at a driver's seat, in a shifting direction (i.e. the front-rear direction). Furthermore, the shift-and-select shaft 1 is rotated by the conversion mechanism in response to the displacement of the shift lever 990 in a selecting direction (i.e. the left-right direction).

Figure 6:
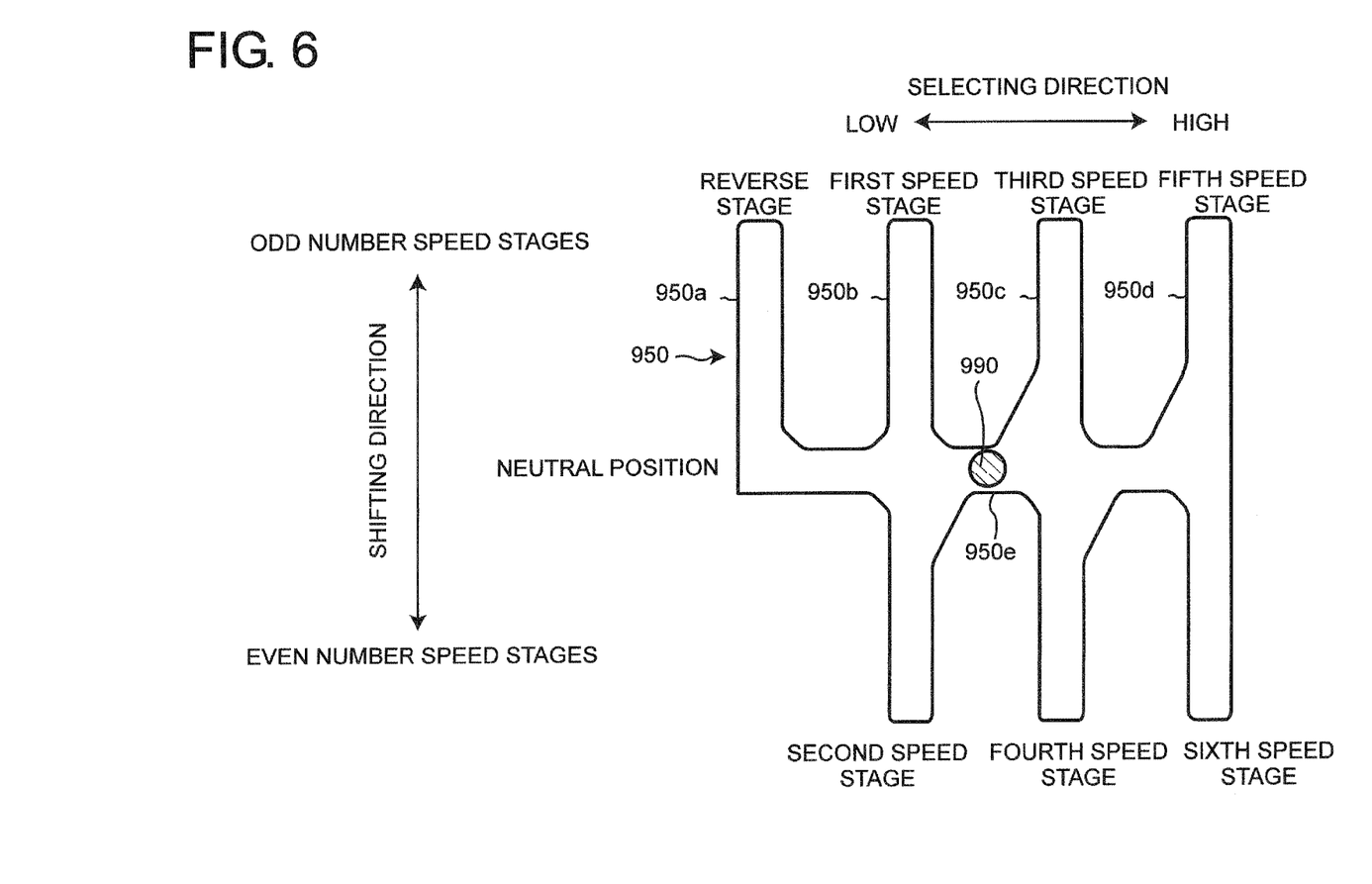
FIG. 6 is an explanatory diagram of shift patterns.

Shift patterns 950, which are within the range of the shift lever 990 to be shifted, will be explained below with reference to FIG. 6. According to the shift patterns 950 of the embodiment, a reverse stage gate 950a, a first-second speed stage gate 950b, a third-fourth speed stage gate 950c and a fifth-sixth speed stage gate 950d are arranged in parallel to one another and neutral positions of those gates are connected via a select gate 950e. The reverse stage gate 950a, the first-second speed stage gate 950b, the third-fourth speed stage gate 950c, and the fifth-sixth speed stage gate 950d are formed to extend in the shifting direction, which corresponds to the front-rear direction. The neutral position of each of the first-second speed stage gate 950b, the third-fourth speed stage gate 950c, and the fifth-sixth speed stage gate 950d is located at an intermediate position thereof in the shifting direction. On the other hand, the neutral position of the reverse stage gate 950a is located at the end thereof, more specifically, at the lower end of the reverse stage gate 950a in this embodiment. The select gate 950e is formed to extend in the selecting direction, which corresponds to the left-right direction.

Figure 2:
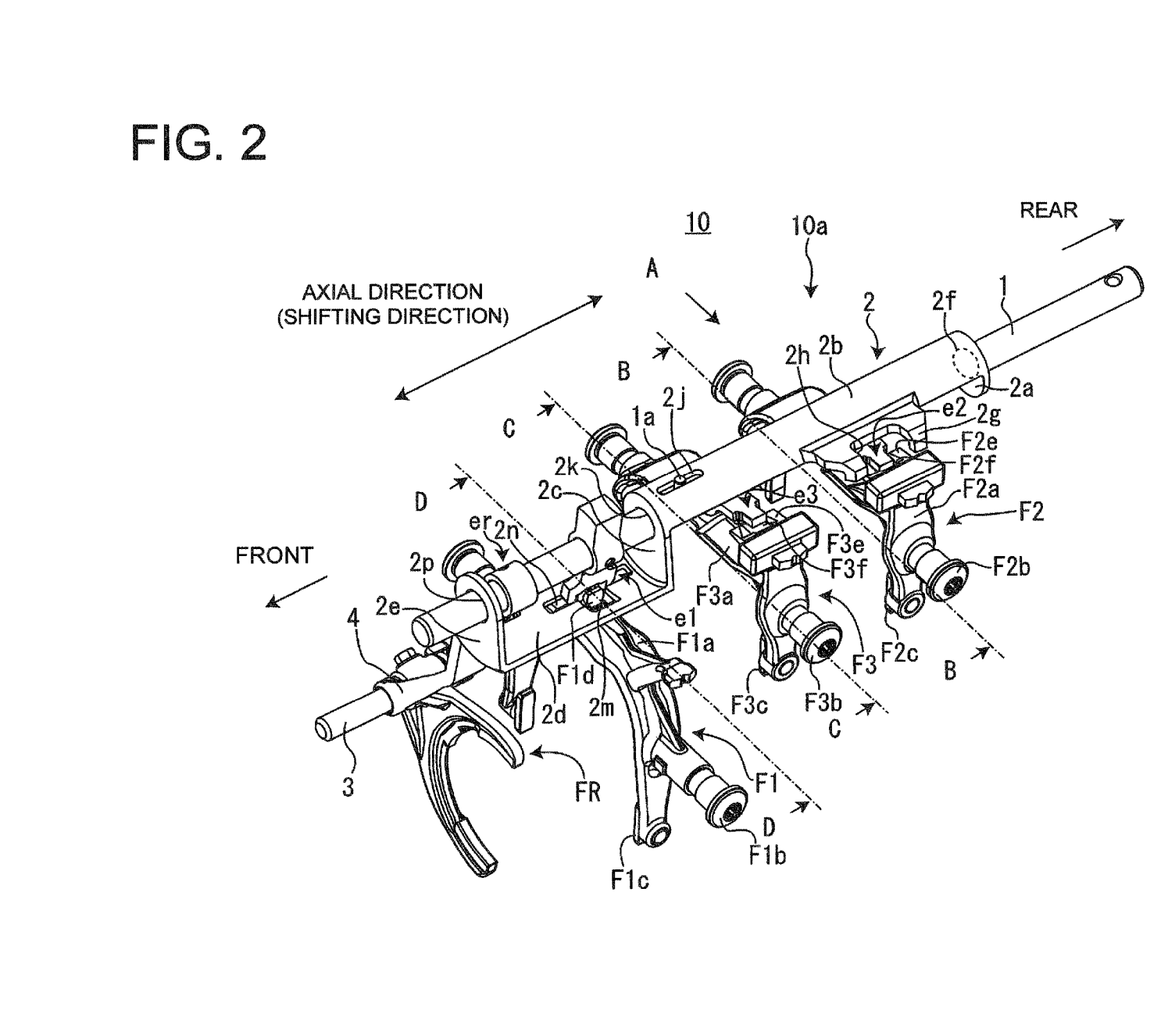
FIG. 2 is a perspective view of a shift mechanism according to an embodiment.
Figure 3:
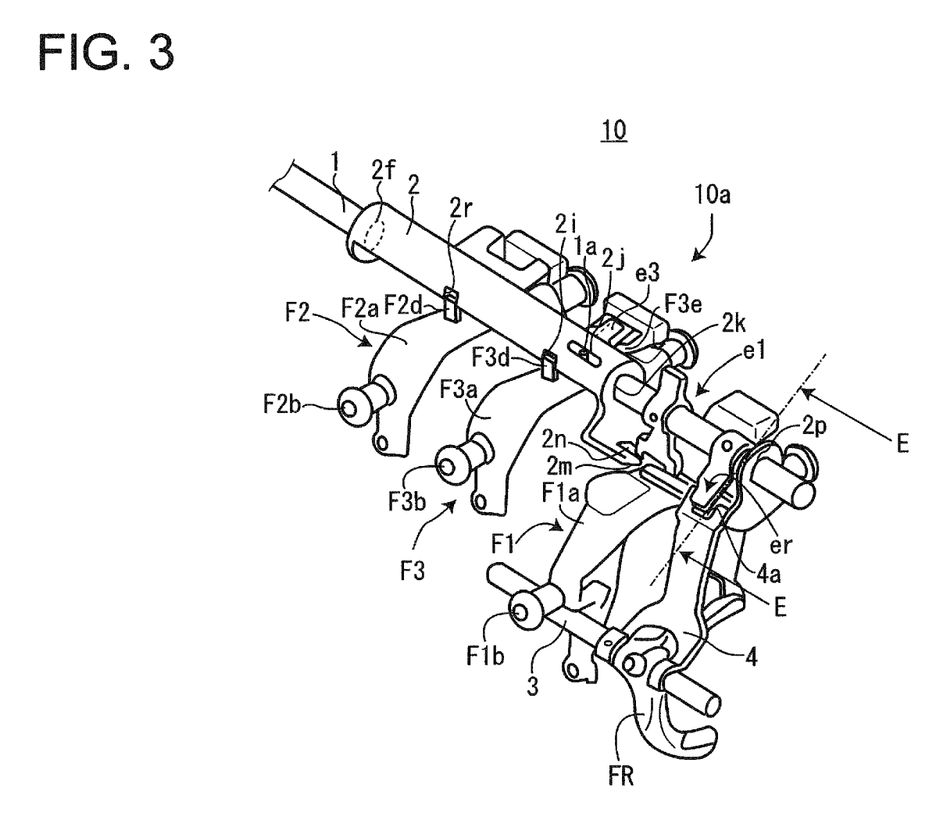
FIG. 3 is a perspective view of the shift mechanism viewed in a direction indicated by the arrow A in FIG. 2.
Figure 5:
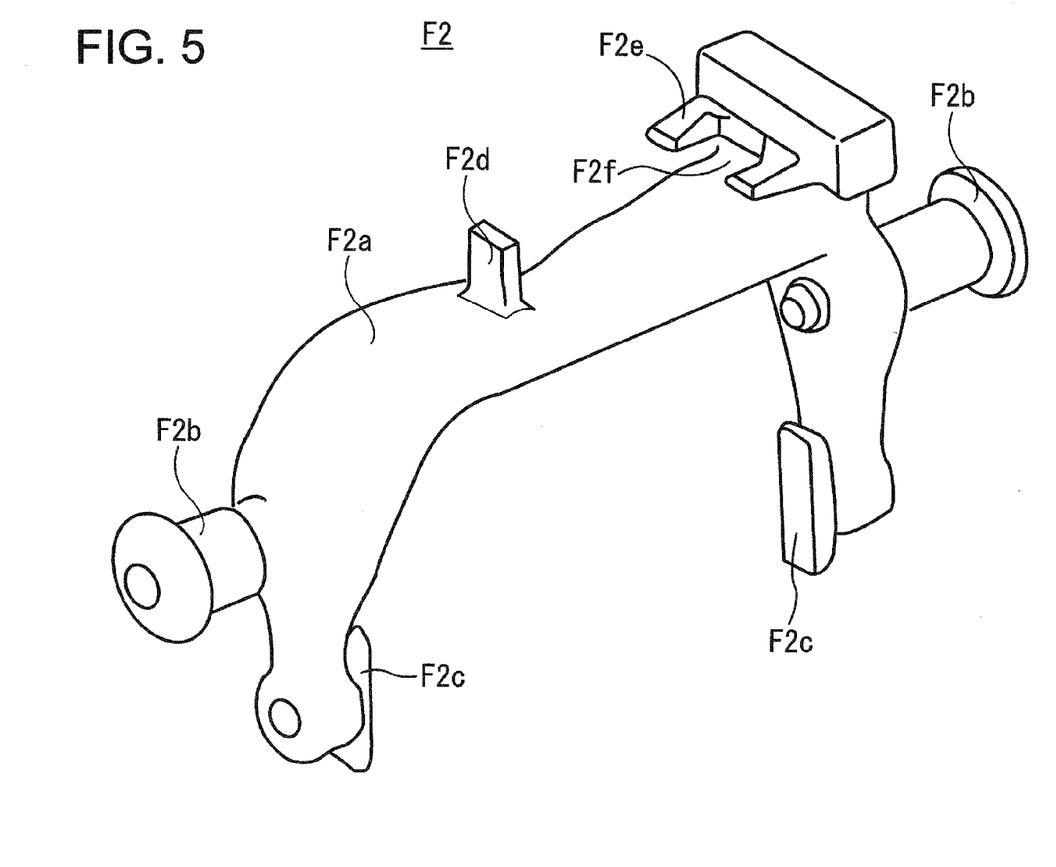
FIG. 5 is a perspective view of a second fork.

As illustrated in FIG. 2, the reverse fork FR, the first fork F1, the third fork F3 and the second fork F2 are arranged in that order from the front to the rear while each fork oppose to the select shift-and-select shaft 1. Each of the first, second and third forks F1, F2, F3 is configured with each of main body portions F1a, F2a, F3a, each of support portions F1b, F2b, F3b, and each of the connection portions F1c, F2c, F3c. Each of the main body portions F1a, F2a, F3a is formed in a substantially C-shape. As illustrated in FIGS. 2, 3 and 5, each of a first engagement portion F1d, a second engagement portion F2d and a third engagement portion F3d is formed to project on the upper portion of each of the main body portions F1a, F2a and F3a.

As illustrated in FIGS. 2 and 5, a second engagement/ disengagement portion F2e (which corresponds to an engagement/disengagement portion) is formed at a location in the vicinity of the second engagement portion F2d, which is formed on the upper portion of the main body portion F2a of the second fork F2, in such a manner that the second engagement/disengagement portion F2e projects toward the interlock member 2. A second engagement/disengagement recessed portion F2f, with which the below-mentioned second inner lever e2 engages, is formed at the second engagement/disengagement portion F2e.

As illustrated in FIGS. 2 and 3, a third engagement/ disengagement portion F3e is formed at a location in the vicinity of the third engagement portion F3d, which is formed on the upper portion of the main body portion F3a of the third fork F3, in such a manner that the third engagement/disengagement portion F3e projects toward the interlock member 2. A third engagement/disengagement recessed portion F3f, with which the below-mentioned third inner lever e3 engages, is formed at the third engagement/ disengagement portion F3e.

Each of the support portions F1b, F2b, F3b is attached to both sides of each of the main body portions F1a, F2a. F3a while each of the support portions F1b, F2b. F3b is allowed to rotate relative to each of the main body portions F1a, F2a, F3a. A pair of each of the support portions F1b, F2b, F3b is fixed on the housing of the transmission 100, thereby each of the first fork F1, the second fork F2 and the third fork F3 is attached to the housing while being allowed to pivot.

The reverse fork shaft 3 is attached to the housing of the transmission 100 in such a manner that the longitudinal direction of the reverse fork shaft 3 extends in the axial direction. The reverse fork FR is attached to the reverse fork shaft 3 while being allowed to be displaced in the axial direction. The reverse fork connecting member 4 is connected to the reverse fork FR.

The first inner lever e1, the second inner lever e2, the third inner lever e3, and the reverse inner lever "er" are fixed on the shift-and-select shaft 1. The first inner lever e1 is configured to engage with the first engagement portion F1d of the first fork F1 or disengage therefrom. The second inner lever e2 is configured to engage with the second engagement/disengagement portion F2e of the second fork F2 or disengage therefrom. Similarly, the third inner lever e3 is configured to engage with the third engagement/disengagement portion F3e of the third fork F3 or disengage therefrom. The reverse inner lever "er" is configured to engage with a reverse engagement portion 4a, which is formed on the reverse fork connecting member 4, or disengage from the reverse engagement portion 4a.

One of the first inner lever e1, the second inner lever e2, the third inner lever e3 and the reverse inner lever "er" selectively engages with one of the corresponding first engagement portion F1d, the second engagement/disengagement portion F2e, the third engagement/disengagement portion F3e and the reverse engagement portion 4a depending on the angle of the shift-and-select shaft 1 in the rotational direction.

Figure 7A:
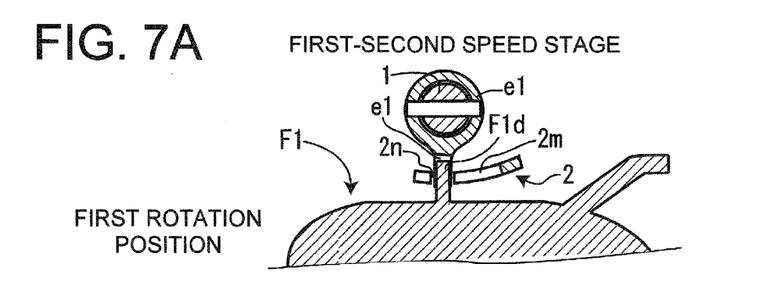
FIG. 7A is a cross-sectional view taken along the line D-D in FIG. 2 and illustrating a positional relationship between a first fork and the interlock member in the case that the first and second speed stages are selected.
Figure 7B:
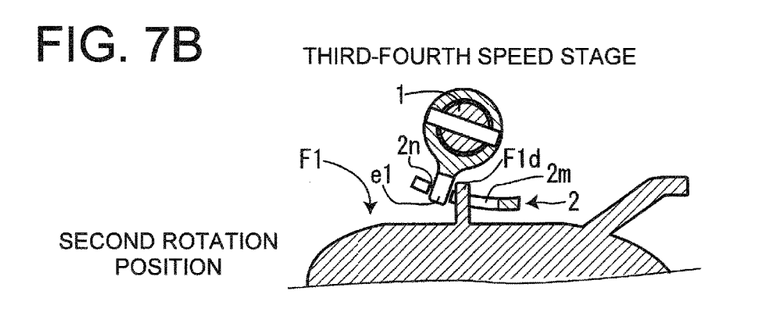
FIG. 7B is a cross-sectional view taken along the line D-D in FIG. 2 and illustrating the positional relationship between the first fork and the interlock member in the case that the third and fourth speed stages are selected.
Figure 7C:
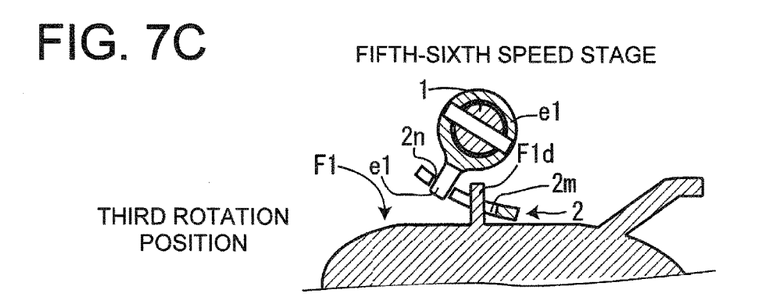
FIG. 7C is a cross-sectional view taken along the line D-D in FIG. 2 and illustrating the positional relationship between the first fork and the interlock member in the case that the fifth and sixth speed stages are selected.
Figure 7D:
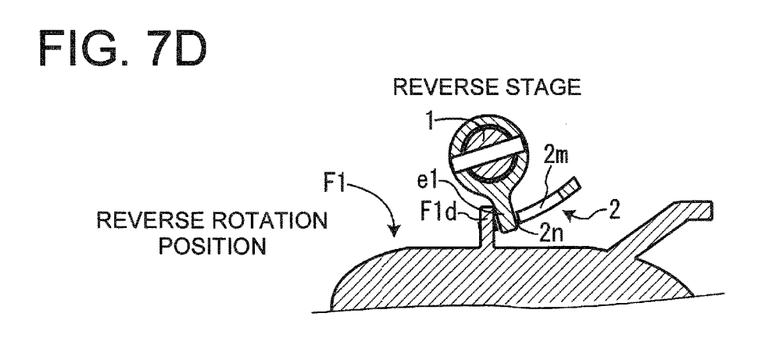
FIG. 7D is a cross-sectional view taken along the line D-D in FIG. 2 and illustrating the positional relationship between the first fork and the interlock member in the case that the reverse stage is selected.

More specifically, in the case that the shift lever 990 is located at the first-second speed stage gate 950b, the shift-and-select shaft 1 is positioned at a first rotation position, and as illustrated in FIG. 7A, the first inner lever e1 engages with the first engagement portion F1d (the first fork F1). On the other hand, as illustrated in FIGS. 7B through 7D, in the case that the shift-and-select shaft 1 is positioned at rotation positions other than the first rotation position, the first inner lever e1 is disengaged from the first engagement portion F1d (the first fork F1).

Figure 8A:
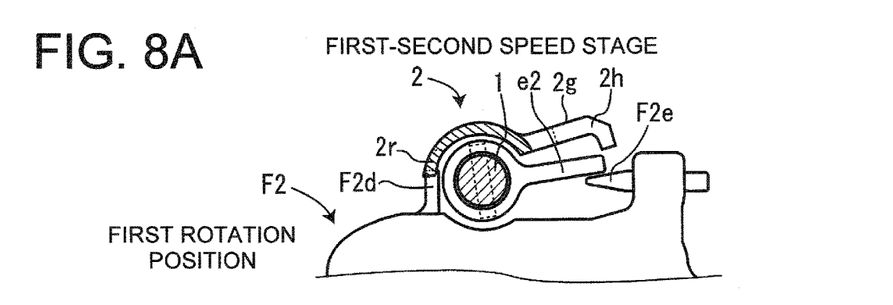
FIG. 8A is a cross-sectional view taken along the line B-B in FIG. 2 and illustrating the positional relationship between a second fork and the interlock member in the case that the first and second speed stages are selected.
Figure 8B:
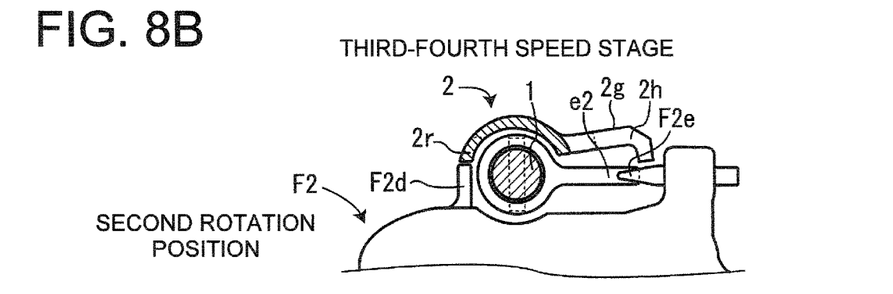
FIG. 8B is a cross-sectional view taken along the line B-B in FIG. 2 and illustrating the positional relationship between the second fork and the interlock member in the case that the third and fourth speed stages are selected.

In the case that the shift lever 990 is located at the third-fourth speed stage gate 950c, the shift-and-select shaft 1 is rotated to a second rotation position, which is located at a position further forwardly rotated from the first rotation position, and as illustrated in FIG. 8B, the second inner lever 2e engages with the second engagement/disengagement portion F2e (the second fork F2). On the other hand, as illustrated in FIGS. 8A, 8B and 8D, in the case that the shift-and-select shaft 1 is positioned at rotation positions other than the second rotation position, the second inner lever e2 is disengaged from the second engagement/disengagement portion F2e (the second fork F2).

Figure 9A:
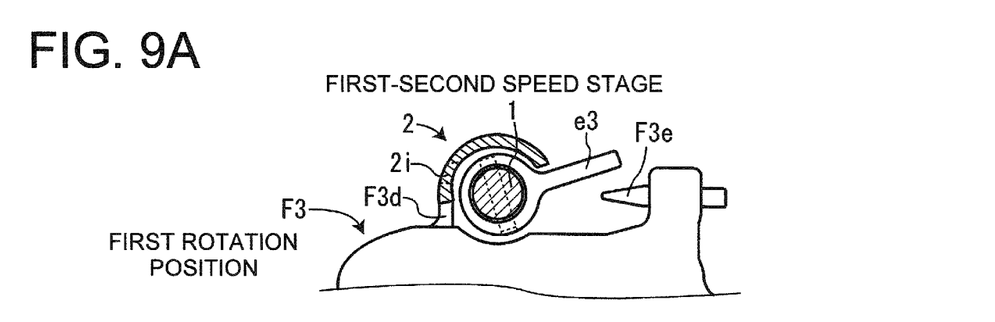
FIG. 9A is a cross-sectional view taken along the line C-C in FIG. 2 and illustrating the positional relationship between a third fork and the interlock member in the case that the first and second speed stages are selected.
Figure 9B:
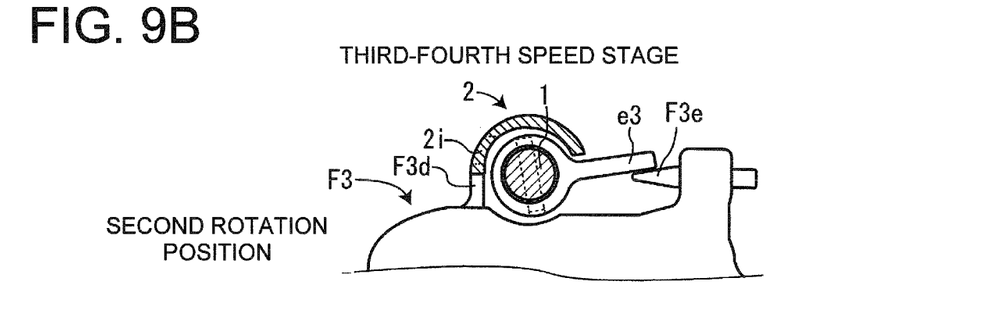
FIG. 9B is a cross-sectional view taken along the line C-C in FIG. 2 and illustrating the positional relationship between the third fork and the interlock member in the case that the third and fourth speed stages are selected.
Figure 9C:
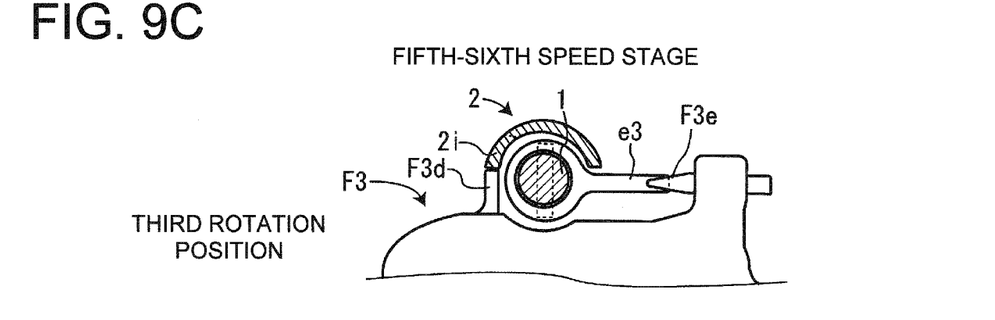
FIG. 9C is a cross-sectional view taken along the line C-C in FIG. 2 and illustrating the positional relationship between the third fork and the interlock member in the case that the fifth and sixth speed stages are selected.
Figure 9D:
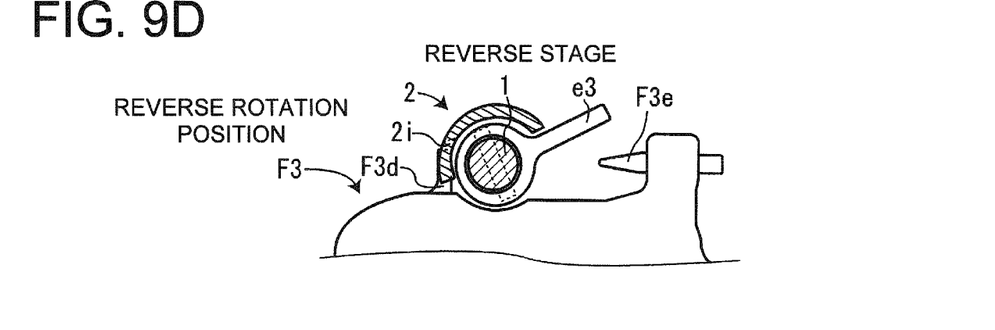
FIG. 9D is a cross-sectional view taken along the line C-C in FIG. 2 and illustrating the positional relationship between the third fork and the interlock member in the case that the reverse stage is selected.

In the case that the shift lever 990 is located at the fifth-sixth speed stage gate 950d, the shift-and-select shaft 1 is rotated to a third rotation position, which is located at a position further forwardly rotated from the second rotation position, the third inner lever e3 engages with the third engagement/disengagement portion F3e (the third fork F3) as illustrated in FIG. 9C. On the other hand, as illustrated in FIGS. 9A, 9B and 9D, in the case that the shift-and-select shaft 1 is positioned at rotation positions other than the third rotation position, the third inner lever e3 is disengaged from the third engagement/disengagement portion F3e (the third fork F3).

Figure 10A:
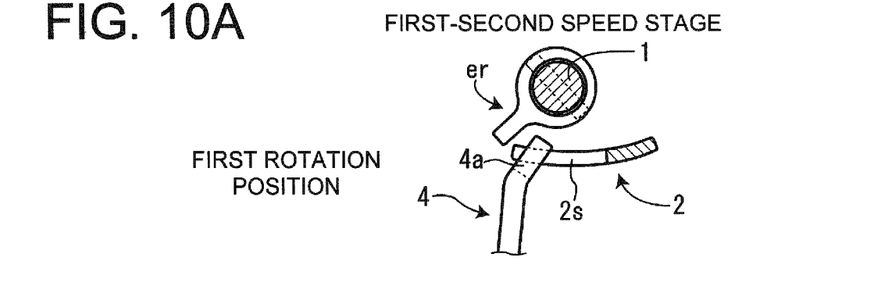
FIG. 10A is a cross-sectional view taken along the line E-E in FIG. 3 and illustrating the positional relationship between a reverse fork and the interlock member in the case that the first and second speed stages are selected.
Figure 10B:
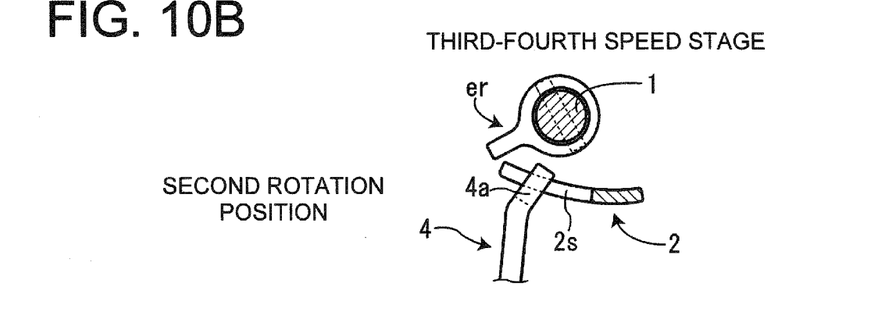
FIG. 10B is a cross-sectional view taken along the line E-E in FIG. 3 and illustrating the positional relationship between the reverse fork and the interlock member in the case that the third and fourth speed stages are selected.
Figure 10C:
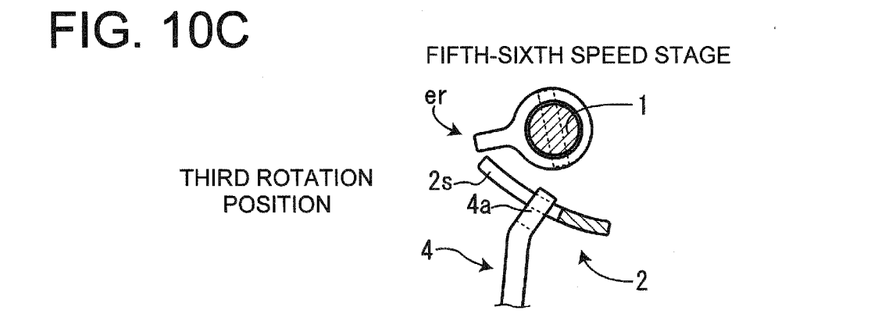
FIG. 10C is a cross-sectional view taken along the line E-E in FIG. 3 and illustrating the positional relationship between the reverse fork and the interlock member in the case that the fifth and sixth speed stages are selected.
Figure 10D:
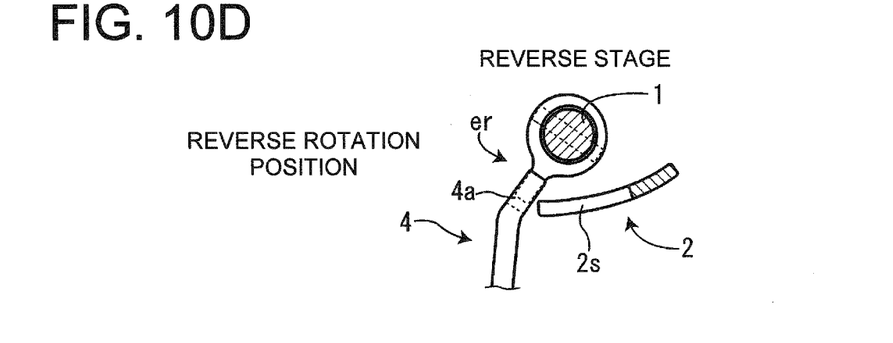
FIG. 10D is a cross-sectional view taken along the line E-E in FIG. 3 and illustrating the positional relationship between the reverse fork and the interlock member in the case that the reverse stage is selected.

In the case that the shift lever 990 is located at the reverse stage gate 950a and the shift-and-select shaft 1 is rotated to a reverse rotation position, which is located at a position reversely rotated from the first rotation position, the reverse inner lever "er" engages with the reverse engagement portion 4a (the reverse fork FR) as illustrated in FIG. 10D. On the other hand, in the case that the shift-and-select shaft 1 is rotated to the rotation positions other than the reverse rotation position, the reverse inner lever "er" is disengaged from the reverse engagement portion 4a (the reverse fork FR).

When the shift lever 990 is shifted to odd number speed stages in the shifting direction while one of the first inner lever e1 the second inner lever e2 and the third inner lever e3 is engaged with one of the corresponding first engagement portion F1d, the second engagement/disengagement portion F2e and the third engagement/disengagement portion F3e, the shift-and-select shaft 1 is displaced in the rearward direction, one of the first fork F1, the second fork F2 and the third fork F3, which is engaged with one of the corresponding first inner lever e1, the second inner lever e2 and the third inner lever e3, pivots and one of the connection portions, F1c, F2c, F3c of one of the pivoted first fork F1, the second fork F2 and the third fork F3 is displaced in the forward direction. Then, one of the hubs H1, H2, H3, which is engaged with one of the displaced connection portions F1c, F2c, F3c, is displaced in the forward direction, thereby establishing a speed stage corresponding to the displaced hubs H1, H2, H3, i.e. one of the first speed stage, the third speed stage, and the fifth speed stage within the transmission 100.

When the shift lever 990 is shifted to the even number speed stages in the shifting direction while one of the first inner lever e1, the second inner lever e2 and the third inner lever e3 is snagged with one of the corresponding first engagement portion F1d, the second engagement/disengagement portion F2e and the third engagement/disengagement portion F3e, the shift-and-select shaft 1 is displaced in the forward direction, one of the first fork F1, the second fork F2 and the third fork F3, which is engaged with one of the corresponding first inner lever e1, the second inner lever e2 and the third inner lever e3, pivots, and one of the connection portions F1c, F2c. F3c of one of the corresponding pivoted first fork F1, the second fork F2 and the third fork F3, is displaced in the rearward direction. Then, one of the hubs H1, H2, H3, which is engaged with one of the corresponding displaced connection portions F1c, F2c. F3c, is displaced in the rearward direction, thereby establishing a speed stage corresponding to the displaced hubs H1, H2, H3, i.e. one of the second speed stage, the fourth speed stage, and the sixth speed stage within the transmission 100.

Further, when the shift lever 990 is shifted to the odd number speed stages in the shifting direction while the reverse inner lever "er" is engaged with the reverse engagement portion 4a, the shift-and-select shaft 1 is displaced in the rearward direction and the reverse fork FR is displaced in the rearward direction, thereby the reverse stage is established within the transmission 100.

(Interlock Mechanism)

An explanation about an interlock mechanism 10a will be given below with reference to FIGS. 2 to 10. The interlock mechanism 10a prevents the pivot of the forks F1, F2, F3 other than the selected fork F1, F2 or F3 in the case that one of the forks F1, F2, F3 is selected and connected with the shift-and-select shaft 1. The interlock mechanism 10a is configured with the interlock member 2, the first fork F1, the second fork F2, the third fork F3, and the reverse fork connecting member 4.

Figure 4:
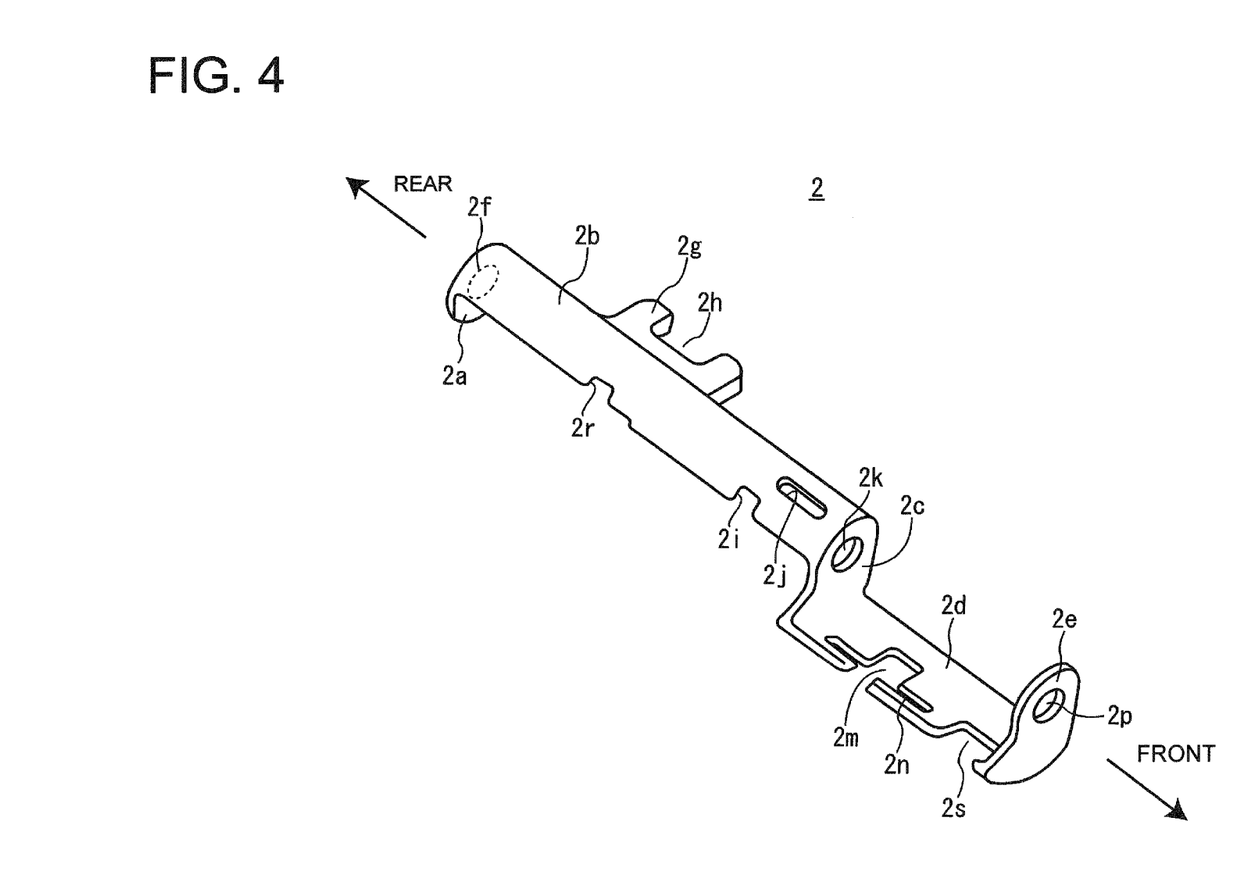
FIG. 4 is a perspective view of an interlock member viewed in the direction indicated by the arrow A in FIG. 2.

As illustrated in FIG. 4, the interlock member 2 is formed with a first plate portion 2a, a first main body portion 2b, a second plate portion 2c, a second main body portion 2d and a third plate portion 2e as a unit, in that order from the rear to the front of the interlock member 2. The first main body portion 2b is formed in a half-cylindrical shape (arched shape) and is connected with the first plate portion 2a at the rear end of the first main body portion 2b and the second plate portion 2c at the front end portion of the first main body portion 2b. The second main body portion 2d is formed in a plate shape and is connected to the lower portion of the second plate portion 2c so as to extend in the forward direction. The third plate portion 2e is connected to the front end portion of the second main body portion 2d.

The first plate portion 2a is formed with a first through hole 2f, and the second plate portion 2c is formed with a second through hole 2k in a coaxial manner relative to the first through hole 2f, so that a communication is established between the first through hole 2f and the second through hole 2k in the front-rear direction. The first plate portion 2e is formed with a third through hole 2p in a coaxial manner relative to the second through hole 2k so that the communication is established between the second through hole 2k and the third through hole 2p in the front-rear direction. As illustrated in FIGS. 2 and 3, the interlock member 2 is coaxially provided on the outer circumference of the shift-and-select shaft 1 so as to surround the shift-and-select shaft 1 in such a manner that the shift-and-select shaft 1 penetrates through the first through hole 2f, the second through hole 2k and the third through hole 2p. An elongated hole 2j extending in the front-rear direction is formed on the first main body portion 2b. As illustrated in FIGS. 2 and 3, a pin 1a formed on the shift-and-select shaft 1 penetrates through the elongated hole 2j. Accordingly, the interlock member 2 rotates together with the shift-and-select shaft 1 as a unit. On the other hand, the shift-and-select shaft 1 is allowed to be displaced in the front-rear direction relative to the interlock member 2. The interlock member 2 is not allowed to be displaced in the front-rear direction (i.e. the axial direction) by the housing of the transmission 100.

As illustrated in FIG. 4, a portion of one side portion of the first main body portion 2b located close to the rear end thereof is cut off to form a second engaged portion 2r. The second engaged portion 2r is engaged with the second engagement portion F2d of the second fork F2 or is disengaged therefrom depending on the position of the interlock member 2 in the rotation direction. An engaged/disengaged portion 2g is formed to project from the other side of the first main body portion 2b at a location opposite to the second engaged portion 2r. The outer end portion of the engaged/disengaged portion 2g is cut off to form an engaged/disengaged recessed portion 2h. The engaged/disengaged recessed portion 2h is engaged with the second engagement/disengagement portion F2e of the second fork F2 or is disengaged therefrom depending on the position of the interlock member 2 in the rotation direction.

A portion of one side of the first main body portion 2b located close to the front end portion thereof is cut off to form a third engaged portion 2i. The third engaged portion 2i is engaged with the third engagement portion F3d or is disengaged therefrom depending on the position of the interlock member 2 in the rotation direction.

A first engaged portion 2m is formed to open at one side end of the second main body portion 2d. Further, a slit 2n is formed on the second main body portion 2d so as to cross the first engaged portion 2m in the front-rear direction. The first engaged portion 2m is engaged with the first engagement portion F1d or is disengaged therefrom depending on the position of the interlock member 2 in the rotation direction.

A fifth engaged portion 2s opening at the one side end of the second main body portion 2d is formed at a location forward of the first engaged portion 2m of the second main body portion 2d. The first engaged portion 2m is formed deeper (in the orthogonal direction to the front-rear direction) than the fifth engaged portion 2s. The fifth engaged portion 2s is engaged with the upper end of the reverse fork connecting member 4 or is disengaged therefrom depending on the position of the interlock member 2 in the rotation direction.

(Function of the Interlock Member)

The function of the interlock member 2 will be explained below with reference to FIGS. 7 through 10. While the shift lever 990 is located at the first-second speed stage gate 950b and the shift-and-select shaft 1 is rotated to the first rotation position, the first engagement portion F1d is engaged with the first inner lever e1 as illustrated in FIG. 7A. While the above-mentioned state is established, the first engagement portion F1d and the first inner lever e1 are located within the first engaged portion 2m at a location where the slit 2n is formed. Therefore, the first fork F1 is allowed to be displaced in the axial direction. When the shift lever 990 is displaced to the odd number speed stages or the even number speed stages in the shifting direction, the shift-and-select shaft 1 is displaced in the axial direction and the first fork F1 is displaced in the axial direction, thereby establishing the first speed stage or the second speed stage within the transmission 100.

While the shift lever 990 is located at the first-second speed stage gate 950b and the shift-and-select shaft 1 is rotated to the first rotation position, the second engagement/disengagement portion F2e is not engaged with the second inner lever e2, as illustrated in FIG. 8A. On the other hand, the second engagement portion F2d is engaged with the second engaged portion 2r. Therefore, the displacement of the second fork F2 in the axial direction is prevented.

While the shift lever 990 is located at the first-second speed stage gate 950b and the shift-and-select shaft 1 is rotated to the first rotation position, the third engagement/disengagement portion F3e is not engaged with the third inner lever e3, as illustrated in FIG. 9A. On the other hand, the third engagement portion F3d is engaged with the third engaged portion 2i. Therefore, the displacement of the third fork F3 in the axial direction is prevented.

While the shift lever 990 is located at the first-second speed stage gate 950b and the shift-and-select shaft 1 is rotated to the first rotation position, the reverse engagement portion 4a of the reverse fork connecting member 4 is not engaged with the reverse inner lever "er", as illustrated in FIG. 10A. On the other hand, the upper end of the reverse fork connecting member 4 is engaged with the fifth engaged portion 2s. Therefore, the reverse fork FR is not allowed to be displaced in the axial direction.

While the shift lever 990 is located at the third-fourth speed stage gate 950c and the shift-and-select shaft 1 is rotated to the second rotation position, the first engagement portion F1d is not engaged with the first inner lever e1, as illustrated in FIG. 7B. While the above-mentioned state is established, the first engagement portion F1d is located within the first engaged portion 2m at a location further inside relative to the location where the slit 2n is formed. Therefore, the displacement of the first fork F1 in the axial direction is prevented.

While the shift lever 990 is located at the third-fourth speed stage gate 950c and the shift-and-select shaft 1 is rotated to the second rotation position, the second engagement/disengagement portion F2e is engaged with the second inner lever e2 as illustrated in FIG. 8B. On the other hand, the second engagement portion F2d and the second engagement/disengagement portion F2e are not engaged with the interlock member 2. Therefore, the second fork F2e is allowed to be displaced in the axial direction. When the shift lever 990 is displaced to the odd number speed stages or the even number speed stages in the shifting direction, the shift-and-select shaft 1 is displaced in the axial direction and the second fork F2 is displaced in the axial direction, thereby establishing the third speed stage or the fourth speed stage within the transmission 100.

While the shift lever 990 is located at the third-fourth speed stage gate 950c and the shift-and-select shaft 1 is rotated to the second rotation position, the third engagement/disengagement portion F3e is not engaged with the third inner lever e3, as illustrated in FIG. 9B. On the other hand, the third engagement portion F3d is engaged with the third engaged portion 2i. Therefore, the displacement of the third fork F3 in the axial direction is prevented.

While the shift lever 990 is located at the third-fourth speed stage gate 950c and the shift-and-select shaft 1 is rotated to the second rotation position, the reverse engagement portion 4a of the reverse fork connecting member 4 is not engaged with the reverse inner lever "er", as illustrated in FIG. 10B. On the other hand, the upper end of the reverse fork connecting member 4 is engaged with the fifth engaged portion 2s. Therefore, the displacement of the reverse fork FR in the axial direction is prevented.

While the shift lever 990 is located at the fifth-sixth speed gate 950d and the shift-and-select shaft 1 is rotated to the third rotation position, the first engagement portion F1d is not engaged with the first inner lever e1, as illustrated in FIG. 7C. While the above-mentioned state is established, the first engagement portion F1d is located within the first engaged portion 2m at a location further inside relative to the location where the slit 2n is formed. Therefore, the displacement of the first fork F1 in the axial direction is prevented.

Figure 8C:
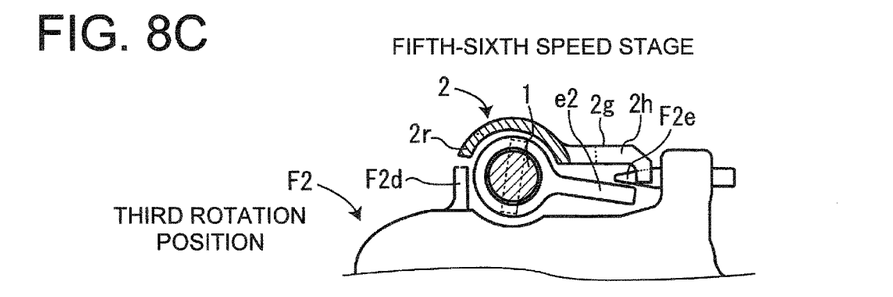
FIG. 8C is a cross-sectional view taken along the line B-B in FIG. 2 and illustrating the positional relationship between the second fork and the interlock member in the case that the fifth and sixth speed stages are selected.
Figure 8D:
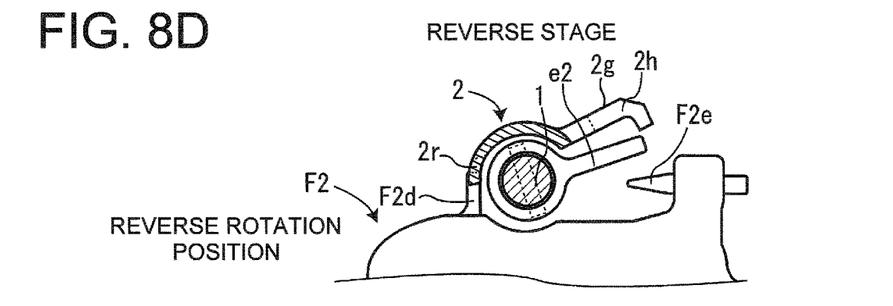
FIG. 8D is a cross-sectional view taken along the line B-B in FIG. 2 and illustrating the positional relationship between the second fork and the interlock member in the case that the reverse stage is selected.

While the shift lever 990 is located at the fifth-sixth speed gate 950d and the shift-and-select shaft 1 is rotated to the third rotation position, the second engagement/disengagement portion F2e is not engaged with the second inner lever e2, as illustrated in FIG. 8C. On the other hand, the second engagement/disengagement portion F2e is engaged with the engaged/disengaged portion 2g. Therefore, the second fork F2 is not allowed to be displaced.

While the shift lever 990 is located at the fifth-sixth speed gate 950d and the shift-and-select shaft 1 is rotated to the third rotation position, the third engagement/disengagement portion F3e is engaged with the third inner lever e3 as illustrated in FIG. 9C. On the other hand, the third engagement portion F3d is not engaged with the interlock member 2. Therefore, the third fork F3 is allowed to be displaced in the axial direction. When the shift lever 990 is displaced to the odd number speed stages or the even number speed stages in the shifting direction, the shift-and-select shaft 1 is displaced in the axial direction and the third fork F3 is displaced in the axial direction, thereby establishing the fifth speed stage or the sixth speed stage within the transmission 100.

While the shift lever 990 is located at the fifth-sixth speed gate 950d and the shift-and-select shaft 1 is rotated to the third rotation position, the reverse engagement portion 4a of the reverse fork connecting member 4 is not engaged with the reverse inner lever "er", as illustrated in FIG. 10C. On the other hand, the upper end of the reverse fork connecting member 4 is engaged with the fifth engaged portion 2s. Therefore, the displacement of the reverse fork FR in the axial direction is prevented.

While the shift lever 990 is located at the reverse gate 950a and the shift-and-select shaft 1 is rotated to the reverse rotation position, the first engagement portion F1d is not engaged with the first inner lever e1, as illustrated in FIG. 7D. On the other hand, the first engagement portion F1d is engaged with the first engaged portion 2m in such a manner that the first engagement portion F1d is located within the first engaged portion 2m at the location further outside relative to the location where the slit 2n is formed. Therefore, the first fork F1 is not allowed to be displaced in the axial direction.

While the shift lever 990 is located at the reverse gate 950a and the shift-and-select shaft 1 is rotated to the reverse rotation position, the second engagement/disengagement portion F2e is not engaged with the second inner lever e2, as illustrated in FIG. 8D. On the other hand, the second engagement portion F2d is engaged with the second engaged portion 2r. Therefore, the displacement of the second fork F2 in the axial direction is prevented.

While the shift lever 990 is located at the reverse gate 950a and the shift-and-select shaft 1 is rotated to the reverse rotation position, the third engagement/disengagement portion F3e is not engaged with the third inner lever e3, as illustrated in FIG. 9D. On the other hand, the third engagement portion F3d is engaged with the third engaged portion 2i. Accordingly, the displacement of the third fork F3 in the axial direction is prevented.

While the shift lever 990 is located at the reverse gate 950a and the shift-and-select shaft 1 is rotated to the reverse rotation position, the reverse engagement portion 4a of the reverse fork connecting member 4 is engaged with the reverse inner lever "er" as illustrated in FIG. 10D. While the above-mentioned state is established, the upper end of the reverse fork connecting member 4 is not engaged with the fifth engaged portion 2s. Therefore, the reverse fork FR is allowed to be displaced in the axial direction. When the shift lever 990 is displaced toward the odd number speed stages in the shifting direction, the shift-and-select shaft 1 is displaced in the axially rearward direction and the reverse fork FR is displaced in the axial direction, thereby establishing the reverse stage within the transmission 100.

(Effects and advantages of the embodiment)

As is evident from the above-described explanation, the interlock mechanism 10a that prevents the displacement of the non-selected forks F1, F2, F3, FR is achieved simply by providing the interlock member 2, which is engaged with/disengaged from the first fork F1, the second fork F2, the third fork F3 and the reverse fork FR depending on the position of the shift-and-select shaft 1 in the rotation direction, at the outer circumference of the shift-and-select shaft 1 in the coaxial manner. Accordingly, the number of components used for the interlock mechanism 10a is reduced compared to the conventional interlock mechanism.

As illustrated in FIGS. 8A through 8D, the second engagement portion F2d and the second engagement/disengagement portion F2e are provided on the second fork F2 so as to project therefrom. The interlock member 2 is provided with the second engaged portion 2r, which is engaged with/disengaged from the second engagement portion F2d, and the engaged/disengaged portion 2g, which is engaged with/disengaged from the second engagement/disengagement portion F2e, at the positions opposite to one another in the radial direction of the interlock member 2. Accordingly, the mechanism for preventing the pivot of the second fork F2 under the situation other than when the second fork F2 is selected is achieved simply by forming the second engagement portion F2d and the second engagement/disengagement portion F2e on the second fork F2 so as to project therefrom, and forming the second engaged portion 2r and the engaged/disengaged portion 2g at the interlock member 2. Since the interlock mechanism 10a has a simple configuration, the interlock mechanism 10a may be downsized, so that the transmission 100 may be downsized, which may result in reducing the manufacturing costs of the interlock mechanism 10a and the transmission 100.

Further, as illustrated in FIG. 4, the first main body portion 2b of the interlock member 2 is formed in the half-cylindrical shape (the arched shape), so that the first main body portion 2b does not exist below the axis of the first through hole 2f and the second through hole 2k. Accordingly, the interlock member 2 and the shift-and-select shaft 1 are arranged close to the second fork F2 and the third fork F3, which may contribute to the downsizing of the transmission 100.

The second engagement/disengagement portion F2e is engaged with the second inner lever e2 while the shift-and-select shaft 1 is positioned at the second rotation position (see FIG. 8B), and is disengaged from the second inner lever e2 while the shift-and-select shaft 1 is positioned at the rotation positions other than the second rotation position (see FIGS. 8A, 8C and 8D). Further, the second engagement/disengagement portion F2e is disengaged from the engaged/disengaged portion 2g while the shift-and-select shaft 1 is positioned at the second rotation position (see FIG. 8B), and is engaged with the engaged/disengaged portion 2g while the shift-and-select shaft 1 is positioned at the third rotation position. Accordingly, the second engagement/disengagement portion F2e prevents the selection of the second fork F2 or the pivot of the second fork F2 while the shift-and-select shaft 1 is not positioned at the second rotation position. Hence, the downsizing of the second fork F2 is achieved and therefore the manufacturing costs of the second fork F2 is reduced, which may contribute to the downsizing as well as the reduction of the manufacturing costs of the transmission 100.

According to a still further aspect of the embodiment, the interlock member 2 includes the first main body portion 2b, which is formed in the half-cylindrical shape, the second main body portion 2d connected to the first main body portion 2b at one end portion thereof, the first plate portion 2a attached at one end portion of the first main body portion in the longitudinal direction thereof and provided with the first through hole 2f, the second plate portion 2c provided at another end portion of the first main body portion in the longitudinal direction thereof and provided with the second through hole 2k in the coaxial manner relative to the first through hole 2f, and the third plate portion 2e provided at another end portion of the second main body portion 2d in the longitudinal direction thereof and provided with the third through hole 2p in the coaxial manner relative to the first and second through holes 2f and 2k, wherein the second engaged portion 2r and the engaged/disengaged portion 2g are formed on the first main body portion 2b at the locations opposite from each other in the radial direction of the interlock member 2, and wherein the shift-and-select shaft 1 is provided coaxially to the interlock member 2 in such a manner that the shift-and-select shaft 1 is inserted through the first, second and third through holes 2f, 2k and 2p.

Accordingly, a mechanism for preventing the pivot of the second fork F2 under the situation other than that when the second fork F2 is selected is achieved with a simple configuration using less components compared to the conventional interlock mechanism, which may contribute to the downsizing of the interlock mechanism 10e and therefore the transmission 100. As a result, the manufacturing costs of the interlock mechanism 10a as well as the transmission 100 may be reduced.

(Other embodiment)

In the above-explained embodiment, the forks F1 and F2 are pivotally provided to the housing of the transmission 100. However, the interlock mechanism 10a may be modified so that the forks F1 and F2 are provided at the housing of the transmission 100 to be linearly movable in the axial direction.

Obviously, numerous modifications and variations of the present invention are possible in light of the above teachings. It is therefore to be understood that within the scope of the appended claims, the present invention may be practiced otherwise than as specifically described herein.

The invention claimed is:

1. An interlock mechanism comprising:
a shift-and-select shaft allowed to be displaced in an axial direction and rotated in a rotation direction;
a first fork arranged so as to be opposed to the shift-and-select shaft;
a second fork arranged so as to be opposed to the shift-and-select shaft;
a first inner lever provided on the shift-and-select shaft, engaged with the first fork while the shift-and-select shaft is positioned at a first rotation position and disengaged from the first fork while the shift-and-select shaft is positioned at rotation positions other than the first rotation position;
a second inner lever provided on the shift-and-select shaft, engaged with the second fork while the shift-and-select shaft is positioned at a second rotation position, which is located at a position further forwardly rotated from the first rotation position and disengaged from the second fork while the shift-and-select shaft is positioned at the rotation positions other than the second rotation position; and
an interlock member coaxially arranged around an outer circumference of the shift-and-select shaft, which is allowed to rotate together with the shift-and-select shaft in the rotation direction as a unit and not allowed to be displaced in the axial direction, wherein
a first engagement portion is formed on the first fork so as to project therefrom;
a second engagement portion is formed on the second fork so as to project therefrom;
a first engaged portion is formed on the interlock member by cutting off a portion thereof and engaged with the first engagement portion while the interlock member is positioned at the second rotation position;
a second engaged portion is formed on the interlock member by cutting off a portion thereof and engaged with the second engagement portion while the interlock member is positioned at the first rotation position;
a third fork arranged so as to be opposed to the shift-and-select shaft; and
a third inner lever provided on the shift-and-select shaft, engaged with the third fork while the shift-and-select shaft is positioned at a third rotation position, which is located at a position further forwardly rotated from the second rotation position and disengaged from the third fork while the shift-and-select shaft is positioned at the rotation positions other than the third rotation position, wherein a third engagement portion is formed to project from the third fork, an engagement/disengagement portion is formed on the second fork, a third engaged portion is formed on the interlock member by cutting off a portion thereof, and engaged with the third engagement portion while the interlock member is positioned at the first and second rotation positions, an engaged/disengaged portion is formed on the interlock member, and engaged with the engagement/disengagement portion while the interlock member is positioned at the third rotation position, the first engaged portion is engaged with the first engagement portion while the shift-and-select shaft is positioned at the third rotation position, the interlock member includes a first main body portion which is formed in a half-cylindrical shape, a second main body portion connected to the first main body portion at one end portion thereof, a first plate portion attached at one end portion of the first main body portion in a longitudinal direction thereof and provided with a first through hole, a second plate portion provided at another end portion of the first main body portion in the longitudinal direction thereof and provided with a second through hole in a coaxial manner relative to the first through hole, and a third plate portion provided at another end portion of the second main body portion in the longitudinal direction thereof and provided with a third through hole in the coaxial manner relative to the first and second through holes, the second engaged portion and the engaged/disengaged portion are formed on the first main body portion at locations opposite from each other in a radial direction of the interlock member, and the shift-and-select shaft is provided coaxially to the interlock member in such a manner that the shift-and-select shaft is inserted through the first, second and third through holes.

2. The interlock mechanism according to Claim 1, wherein the engagement/disengagement portion engages with the second inner lever while the shift-and-select shaft is positioned at the second rotation position and is disengaged from the second inner lever while the shift-and-select shaft is positioned at the rotation positions other than the second rotation position.

* * * * *